United States Patent
Kondo et al.

(10) Patent No.: US 6,730,428 B1
(45) Date of Patent: May 4, 2004

(54) METHOD OF RECYCLING LEAD-ACID STORAGE BATTERY

(75) Inventors: Toshihiko Kondo, Nakamura-ku (JP); Hideki Sugiyama, 5, Kitta-cho, Seki-shi, Gifu 501-3843 (JP)

(73) Assignees: T & K Co., Ltd., Nagoya (JP); Hideki Sugiyama, Seki (JP)

( * ) Notice: Subject to any disclaimer, the term of this patent is extended or adjusted under 35 U.S.C. 154(b) by 0 days.

(21) Appl. No.: 09/936,992

(22) PCT Filed: Jan. 24, 2000

(86) PCT No.: PCT/JP00/00321

§ 371 (c)(1),
(2), (4) Date: Dec. 27, 2001

(87) PCT Pub. No.: WO01/56106

PCT Pub. Date: Aug. 2, 2001

(30) Foreign Application Priority Data

Jul. 24, 1998 (JP) ............................ 10-209262

(51) Int. Cl.⁷ ...................... H01M 10/50; H01M 10/44
(52) U.S. Cl. ............................ 429/49; 205/63
(58) Field of Search ................ 429/49; 205/63

(56) References Cited

U.S. PATENT DOCUMENTS 5,652,497 A  7/1997  Boivie ..................... 320/4
5,677,075 A  10/1997  Fujita ..................... 429/48

FOREIGN PATENT DOCUMENTS

| GB | 2 187 903 | 9/1987 |
| JP | 2 63-23623 | 5/1988 |
| JP | 9-45379 | 2/1997 |
| JP | 2 2736243 | 1/1998 |

*Primary Examiner*—Patrick Ryan
*Assistant Examiner*—Thomas H. Parsons
(74) *Attorney, Agent, or Firm*—Oliff & Berridge, PLC

(57) ABSTRACT

The lead sulfate ($PbSO_4$) deposited on the surface of the positive electrode 18 or negative electrode 20 is reduced owing to the flow of the pulsating direct current from the positive electrode 18 toward the negative electrode 20 in the sullation removing step 34, while at the same time the positive electrode 18 of the lead-acid storage battery 10 is activated through the electrochemical doping in which the carbon suspension obtained by the electrolytic oxidation of the carbon positive electrode is used as at least a part of the battery electrolyte of the lead-acid storage battery 10 in the electrode activating step 40. Therefore, it is possible to select, as recyclable batteries, a wider range of used lead-acid storage batteries, so that even an used lead-acid storage battery which has a battery electrolyte whose specific gravity is considerably lowered and which accordingly appears to suffer from the sulfation can be recovered to have substantially the same capacity as that of a new lead-acid storage battery. Thus, the invention permits a wider range of the used lead-acid storage batteries to be recycled.

15 Claims, 3 Drawing Sheets

|  | AFTER COLLECTING STEP | AFTER SULFATION REMOVING STEP | AFTER ELECTRODE ACTIVATING STEP |
|---|---|---|---|
| OPEN-CIRCUIT VOLTAGE | 11.05 | 12.78 | 13.045 |
| ON-LOAD VOLTAGE | 9.65 | 10.45 | 10.67 |
| RECOVERED VOLTAGE | 12.09 | 12.42 | 12.36 |

(b)

|  | AFTER COLLECTING STEP | AFTER SULFATION REMOVING STEP | AFTER ELECTRODE ACTIVATING STEP |
|---|---|---|---|
| OPEN-CIRCUIT VOLTAGE | 12.651 | 14.29 | 13.03 |
| ON-LOAD VOLTAGE | 9.91 | 10.41 | 10.62 |
| RECOVERED VOLTAGE | 12.23 | 12.38 | 12.32 |

(c)

|  | AFTER COLLECTING STEP | AFTER SULFATION REMOVING STEP | AFTER ELECTRODE ACTIVATING STEP |
|---|---|---|---|
| OPEN-CIRCUIT VOLTAGE | 12.51 | 13.097 | 13.01 |
| ON-LOAD VOLTAGE | 10.19 | 10.23 | 10.87 |
| RECOVERED VOLTAGE | 12.44 | 12.51 | 12.38 |

(d)

|  | AFTER COLLECTING STEP | AFTER SULFATION REMOVING STEP | AFTER ELECTRODE ACTIVATING STEP |
|---|---|---|---|
| OPEN-CIRCUIT VOLTAGE | 6.951 | 12.815 | 12.917 |
| ON-LOAD VOLTAGE | * | 10.28 | 10.56 |
| RECOVERED VOLTAGE | * | 12.49 | 12.38 |

(e)

|  | AFTER COLLECTING STEP | AFTER SULFATION REMOVING STEP | AFTER ELECTRODE ACTIVATING STEP |
|---|---|---|---|
| OPEN-CIRCUIT VOLTAGE | 12.38 | 12.67 | 13.055 |
| ON-LOAD VOLTAGE | 10.12 | 10.28 | 10.78 |
| RECOVERED VOLTAGE | 12.04 | 12.19 | 12.32 |

UNIT: V(VOLT)

METHOD OF RECYCLING LEAD-ACID STORAGE BATTERY

TECHNICAL FIELD

The present invention relates to a method of recycling a lead-acid storage battery whose capacity has been reduced due to a film of lead sulfate formed on a surface of an electrode.

BACKGROUND ART

As one type of a secondary battery which can be repeatedly charged and discharged, a lead-acid storage battery is often used for electric motor vehicles and other purposes since it is relatively cheap. Some examples of the lead-acid storage battery are defined in JIS C8701 (portable storage battery), JIS D5301 (storage battery for automobiles), JIS D 5302 (small-sized storage battery for automobiles), JIS D 5303 (storage battery for electric vehicles), JIS F 8101 (storage battery for boats), JIS W 7301 (storage battery for airplanes). However, when the time of use or service of such a storage battery amounts to, for example, about 2–3 years, there generally occurs a phenomenon that the charge capacity is considerably reduced due to the chronological deterioration. In the occurrence of such a phenomenon called "battery exhaustion", it is generally determined that the service life is over when the actual charge capacity is reduced to, for example, about 50% of the initial charge capacity, so that the battery is replaced with a new one.

A main cause of the above phenomenon, i.e., about 70–80% of the cause of the phenomenon, is development of so-called "sulfation" in which a hard film consisting of large crystals of lead sulfate ($PbSO_4$) is formed on the surfaces of the electrode plates after the battery is left discharged. It is common that the electrode plate consists of, for example, a sponge structure having a surface in which a multiplicity of small perforations are formed in the interest of raising the capacity of the battery. The small perforations are closed by the solidified non-conducting lead sulfate in the "sulfation", thereby reducing the battery capacity while considerably increasing the internal resistance, as a result of reduction of a surface area of the electrode plate which can contribute to charging and discharging of the battery. It is known that the reaction is promoted so that a fatal damage is given to the lead-acid storage battery, particularly, when the load applied to the battery is held constant in spite of the reduction of the surface area of dischargeable electrode plate due to the deposition of the lead sulfate.

Since the lead-acid storage battery whose service life is over as a result of reduction of the capacity contains a large amount of lead, it can not be easily disposed of as an ordinary industrial waste or refuse. Thus, the used lead-acid storage batteries are likely to be piled up out in the open. It would be possible to collect the lead from the used battery in a metal collection treatment. However, such a treatment requires a large investment such as a relatively large plant equipment for a lead refining operation in which crushing/screening, reduction fusion and electrolysis of the lead are effected for refining the lead, leading to an increase in the cost and making it impossible to easily carry it out.

On the other hand, as described in the publication of Japanese Patent No. 2736243 (issued on April 2, Heisei 10), there is proposed a technique of activating the positive electrode ($PbO_2$) of the lead-acid storage battery through an electrochemical doping, by adding a carbon suspension, which is obtained by electrolytic oxidation of a carbon positive electrode in a water system, to a battery electrolyte of the lead-acid storage battery, and also proposed to use the carbon suspension as a regenerant for regenerating the lead-acid storage battery. However, although the activation of the positive electrode is surely achieved by supplementing the battery electrolyte of the used lead-acid storage battery with the carbon suspension, the activation is achieved only in the remaining area of the electrode plate which is not covered by the deposition of the lead sulfate. Thus, in the disclosed technique in which the lead sulfate itself is not removed, it is necessary to select, as recyclable batteries, only those of the used batteries which have a specific gravity of not smaller than about 1.24 and which are accordingly not considered to suffer from the sulfation. Otherwise, it is extremely difficult to restore the capacity of the used battery to the level of capacity of a new battery. That is, the application of the disclosed technique is limited to the recycling of such used lead-acid storage batteries that have relatively better conditions.

SUMMARY OF THE INVENTION

The present invention was developed under the above-described background situation. An object to be achieved by the present invention is to provide a method of recycling a wide range of used lead-acid storage batteries.

As a result of various studies made by the present inventors under the above-described background situation, the inventors found out a fact that it is possible to advantageously recycle the used lead-acid storage battery whose capacity has been considerably reduced, by combining the above-described technique of adding the carbon suspension to the battery electrolyte for the purpose of activating the electrode plate, with a technique of charging a lead-acid storage battery of an emergency vehicle which is not usually used but needs to be surely activated in an emergency, by continuously or periodically applying a pulsating direct current having a relatively high frequency of about 10 kHz, to the lead-acid storage battery for the purpose of preventing occurrence of the sulfation. That is, it is considered that the used lead-acid storage battery can be recovered to have substantially the same capacity as that of a new lead-acid storage battery, since an area of the surface of the electrode plate which can contribute to the charging and discharging is restored owing to removal of the lead sulfate deposited on the surface of the electrode plate by charging the battery with the pulsating current having the relatively high frequency, while the electrode plate is activated through the electrochemical doping by adding the carbon suspension to the battery electrolyte. This invention was developed based on this knowledge.

That is, the essence of the present invention is a method of recycling a lead-acid storage battery, to recover a capacity of the battery which has been reduced due to deposition of a lead sulfate on a surface of an electrode of the battery. The method comprises: (a) a first step of causing a pulsating direct current to flow from a positive electrode toward a negative electrode of the battery, for thereby reducing the lead sulfate deposited on the surface of the electrode; and (b) a second step of activating the positive electrode through an electrochemical doping in which a direct current voltage is applied to the battery with a carbon suspension being used as a battery electrolyte of the battery. The carbon suspension is obtained by electrolytic oxidation of a carbon positive electrode in a water system.

In this method, the lead sulfate deposited on the surface of the electrode is reduced owing to the flow of the pulsating direct current from the positive electrode toward the negative electrode in the first step, while at the same time the positive electrode is activated through the electrochemical doping in which the carbon suspension obtained by the electrolytic oxidation of the carbon positive electrode is used as at least a part of the battery electrolyte of the lead-acid storage battery in the second step. Therefore, according to the present invention, even an used lead-acid storage battery which has a battery electrolyte whose specific gravity is considerably lowered and which accordingly appears to suffer from the sulfation can be recovered to have substantially the same capacity as that of a new lead-acid storage battery. Thus, the invention makes it possible to select, as recyclable batteries, a wider range of used lead-acid storage batteries including the ones which are conventionally considered to be unrecyclable, thereby remarkably reducing the used storage batteries to be disposed of as wastes. Further, the adding of the carbon suspension into the battery electrolyte makes it possible to prevent the lead sulfate from adhering to the electrode of the lead-acid storage battery, thereby providing an advantage that it is not necessary to cause periodic or continuous flow of the pulsating direct current.

Preferably, in the first step, the pulsating direct current is caused to flow by applying, to the battery, a pulsating direct current voltage which is sufficiently higher than a terminal voltage of the battery, and wherein the pulsating direct current has a rectangular, sinusoidal or partially arcuate waveform.

Further, preferably, in the first step, the pulsating direct current is caused to flow from the positive electrode toward the negative electrode for a time ranging from 12 to 24 hours, so that the lead sulfate is surely removed from the surface of the electrode.

Further, preferably, the pulsating direct current used in the first step has a frequency ranging from 2 to 12 kHz. If the frequency of the pulsating current is not lower than 12 kHz, the efficiency of removing the lead sulfate is drastically reduced. If the frequency is not higher than 2 kHz, the time required for removing the lead sulfate is increased whereby the working efficiency is reduced.

Further, preferably, the water system used in the second step consists of a pure water system, an aqueous solution of a dilute sulfuric acid, or an aqueous solution including a small amount of additive electrolyte which does not deteriorate performance of the lead-add storage battery when the additive electrolyte is added to a battery electrolyte.

Further, preferably, the carbon suspension used in the second step consists of a colloidal suspension in which surfaces of carbon colloidal particles are chemically modified with a hydraulic group such as a carbonyl group, a carboxyl group and a hydroxyl group.

Further, preferably, the direct current voltage is applied to the battery in the second step such that an electric current flows from the positive electrode toward the negative electrode of the battery, by using a constant current or a pulsating current which changes in magnitude in a predetermined cycle.

Further, preferably, the second step in which the carbon suspension obtained by the electrolytic oxidation of the carbon positive electrode in the water system is added to the battery electrolyte of the battery is implemented before, during or after implementation of the first step in which the pulsating direct current is caused to flow from the positive electrode toward the negative electrode of the battery.

BRIEF DESCRIPTION OF DRAWINGS

FIG. 5 is view for indicating, by way of examples, changes of actual voltages of five lead-acid storage batteries in each of which the sulfation has been developed.

BEST MODE FOR CARRYING OUT THE INVENTION

Figure 1:
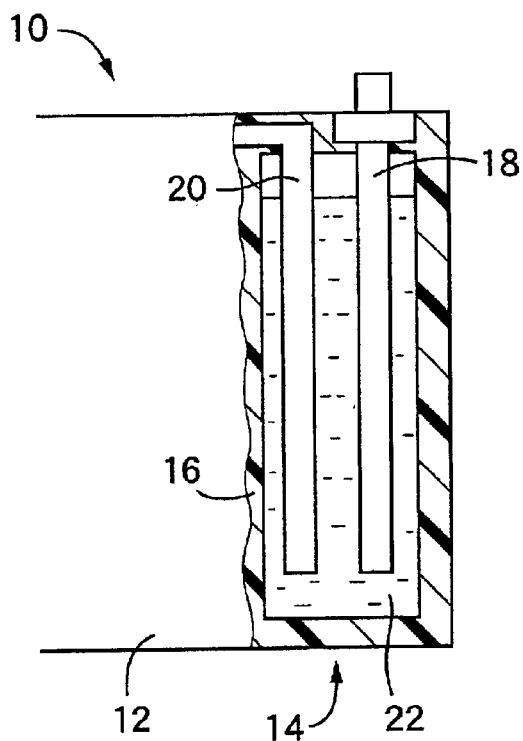
FIG. 1 is a view for explaining the construction of a storage battery to which one embodiment of the present invention is applied.

FIG. 1 is a view for explaining the construction of a lead-acid storage battery 10 in which one embodiment of the present invention is applied. As shown in the figure, in a case 12, there are a plurality of for example, six cells 14 which are defined by partition walls 16. In each of the cells 14, there are a positive electrode 18 and a negative electrode 20 which are arranged to be opposed to each other with a predetermined spacing distance therebetween. Each cell 14 is filled with a battery electrolyte 22 consisting of (dilute) sulfuric acid solution such that the positive electrode 18 and the negative electrode 20 are sufficiently immersed in the battery electrolyte 22. The voltage of each cell 14 is about 2V when the battery 10 is charged. Thus, the terminal voltage of the battery 10 is 12V where the battery 10 is constituted by six cells. The terminal voltage of the battery 10 is 24V where the battery 10 is constituted by twelve cells.

The positive electrode 18 of the lead-acid storage battery 10 is constituted by one of a Tudor Plante type, a Chloride Plante type, a Paste type and an Ebonite-clad type which are well known. The electrode of the Tudor Plante type is provided by an electrode plate which is made of Pb. The electrode plate has a surface whose area is increased by slits which are formed in the surface so as to be arranged in a lattice. On the surface of the electrode plate, a layer of lead dioxide ($PbO_2$) is formed by an electrolytic oxidation. The electrode of the Chloride Plante type is provided by an electrode plate which is made of Pb-Sb alloy. The electrode plate has a multiplicity of through-holes in each of which a spiral ribbon made of lead is fitted. The electrode of the Paste type is provided by a grid which is made of Pb or Pb-Sb alloy and which is filled with powders of lead dioxide ($PbO_2$) or lead. The electrode of the Ebonite-clad type is provided by an ebonite tube having a multiplicity of pores formed therein. A core bar made of Pb-Sb alloy is introduced through the ebonite tube. Powders of lead dioxide ($PbO_2$) or lead are filled between the core bar and an inner circumferential surface of the ebonite tube. The negative electrode 20 of the lead-acid storage battery 10 is usually constituted by the above-described Paste type. In either of these types, the positive electrode 18 has at least a surface constituted by the porous lead dioxide ($PbO_2$) which serves as an active material, while the negative electrode 20 has at least a surface constituted by the porous lead (Pb) which serves as an active material.

The lead-acid storage battery 10 constructed as described above is discharged in accordance with reaction formulas (1) and (2), and is charged in accordance with reaction formulas (3) and (4). As is apparent from the formulas (1), (2) and the formulas (3), (4), the specific gravity of the battery electrolyte 22 is reduced in the discharge of the battery 10 in which the sulfuric acid contained in the battery electrolyte 22 combines with the electrode for thereby generating water, since the specific gravity of the sulfuric acid is higher than that of the water. On the other hand, the specific gravity of the battery electrolyte 22 is increased in the charge of the battery 10 in which the electrode takes in the water and emits the sulfuric acid. The sulfuric acid solution used as the battery electrolyte 22 has a specific gravity of about 1.25. This specific gravity of the battery electrolyte 22 within the cell 14 is increased to about 1.28 when the lead-acid storage battery 10 is fully charged.

Figure 2:
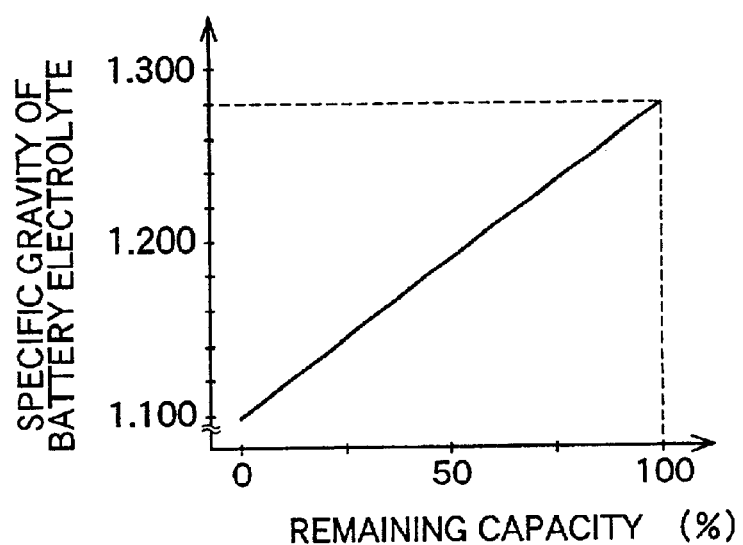
FIG. 2 is a view for explaining a relationship between the remaining capacity and the specific gravity of the battery electrolyte in the lead-acid storage battery of FIG. 1.

The remaining capacity (%), which corresponds to the capacity for storing the electricity in the lead-acid storage battery 10, has a close relationship with the specific gravity of the battery electrolyte 22, as shown in FIG. 2. Thus, the state of charge of the lead-acid storage battery 10 can be estimated by measuring the specific gravity of the battery electrolyte 22. As is apparent from FIG. 2, a lead-acid storage battery of 30 Ah (ampere-hour) in which a specific gravity of the battery electrolyte is 1.28 can perform the same amount of work as a lead-acid storage battery of 60 Ah (ampere-hour) in which a specific gravity of the battery electrolyte is 1.19.

(During Charge)
Positive Electrode:

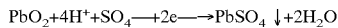  (1)

Negative Electrode:

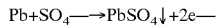  (2)

(During Discharge)
Positive Electrode:

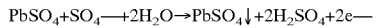  (3)

Negative Electrode:

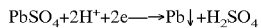  (4)

The lead-acid storage battery 10 has a property that lead sulfate ($PbSO_4$) is deposited on the surfaces of the positive and negative electrodes 18, 20 as a result of a chemical reaction after the charge and discharge have been repeated in the use of the battery 10 for a certain period of time, or after spontaneous discharge with age has continued for a certain period of time. The deposited lead sulfate forms a solidified white hard film which hardly exhibits an electronic conductivity or an ionic conductivity. Thus, the formation of the hard film leads to a reduction in the surface area of the electrode plate contributing to discharging of the battery, thereby resulting in a reduction in the capacity of the battery 10. The capacity reduction is indicated by a so-called "sulfation" in which the electrode plate is whiten. The sulfation determines the service life of the lead-acid storage battery 10, and provides a considerable increase in the internal resistance, causing a heat generation during the charge. In general, it is considered that the sulfation is occurred when the specific gravity of the battery electrolyte is not larger than 1.25.

Figure 3:
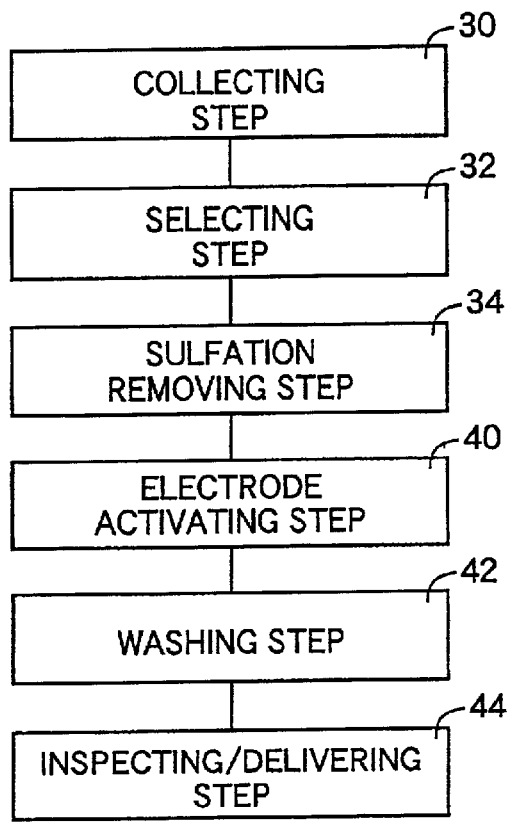
FIG. 3 is a flow chart for explaining steps for recycling an used lead-acid storage battery.

FIG. 3 illustrates a process of recycling an used lead-acid storage battery whose capacity has been reduced. The process is initiated by a collecting step 30 in which used lead-acid storage batteries are collected in a predetermined channel of distribution. The collecting step 30 is followed by the selecting step 32 in which unrecyclable batteries such as one having a distorted electrode plate and one having a short circuit are removed from the collected used lead-acid storage batteries so that recyclable batteries such as one having been excessively discharged due to its spontaneous discharge are selected. For example, batteries each having a specific gravity not smaller than 1.21, 12V-batteries each having an open-circuit voltage not smaller than 4V, and batteries in each of which a specific gravity difference between the cells is not larger than 0.04 are selected by using well known voltmeter and hydrometer.

Figure 4:
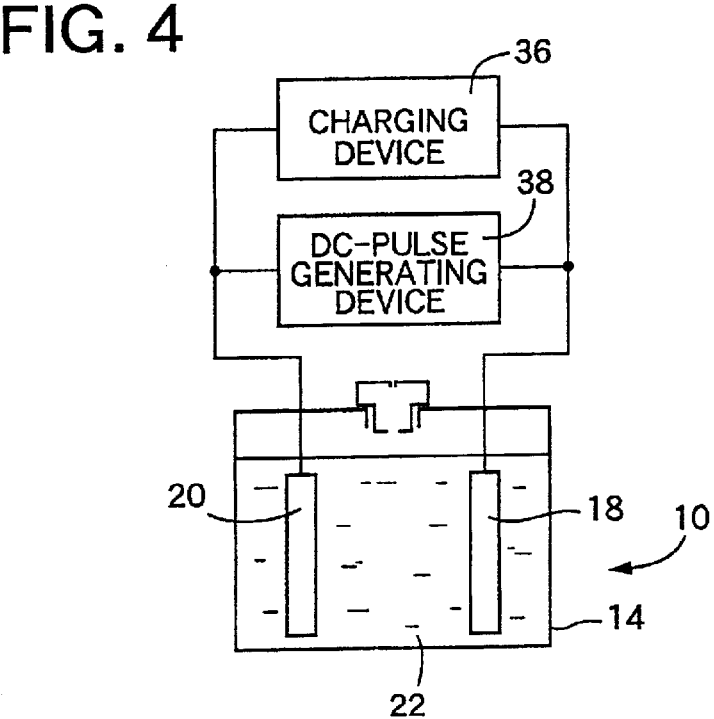
FIG. 4 is a view for explaining a charging device and a DC-pulse generating device which are used in a sulfation removing step of FIG. 3.

Subsequently, in a sulfation removing step 34, a pulsating direct current voltage is superimposed to the charging voltage by using a DC-pulse generating device 38 which is connected in parallel with a charging device 36, as shown in FIG. 4, so that a pulsating direct current is being added to the charging current for about 8–12 hours, whereby the lead sulfate deposited on the surfaces of the electrodes is removed. That is, the pulsating direct current serves to loose the molecular unification of crystals of the lead sulfate, for thereby decomposing the lead sulfate, whereby the lead sulfate ion is returned to the battery electrolyte 22. The removal of the lead sulfate from the electrodes can be confirmed by checking the increase of the specific gravity of the battery electrolyte 22 in the sulfation removing step 34. In the present embodiment, this sulfation removing step 34 corresponds to a first step.

The DC-pulse generating device 38 is adapted to output the pulsating direct current voltage which is required to cause the pulsating direct current of about 1–8 A (ampere) having a frequency of about 2–12 kHz, to flow from the positive electrode 18 toward the negative electrode 20. This pulsating direct current voltage has a value which is sufficiently higher than that of the rated terminal voltage or that of the charging voltage, and which is set manually or set automatically in a feedback controlling such that the pulsating direct current has a target value per unit area of the plate of the positive electrode 18 or the negative electrode 20. The pulsating direct current does not necessarily have a rectangular waveform, but may have also a sinusoidal waveform or a partially arcuate waveform.

Subsequently, in an electrode activating step 40, the charging voltage of the above-described charging device 36 or a voltage having the same polarity as that of the charging voltage is being applied to the used lead-acid storage battery for 5–8 hours, while a carbon suspension which has been obtained by electrolytic oxidation of a carbon positive electrode in a water system being added to the battery electrolyte in each cell of the used lead-acid storage battery that has been subjected to the above-described sulfation removing step 34. In this instance, the ratio of the carbon suspension added to the battery electrolyte, with respect to the battery electrolyte is about $\frac{1}{12}$–$\frac{1}{3}$. In this step, the positive electrode 18 of the used lead-acid storage battery is activated by an electrochemical doping. In the present embodiment, this electrode activating step 40 corresponds to a second step.

The carbon suspension used in the electrode activating step 40 has a pH of 2.5–3.5, and includes a colloidal carbon (carbon colloid) which has an average particle diameter not larger than 1 $\mu$m and which has been obtained by applying a voltage of about 7 V, in a water, to a positive electrode obtained by burying an artificial black lead whose particle size is about 1 $\mu$m and to a negative electrode made of a platinum. The carbon suspension does not necessarily have to be a pure water system, but may be a dilute sulfuric acid aqueous solution, or other aqueous solution including a small amount of additive electrolyte which does not deteriorate performance of the lead-acid storage battery when it is added into the battery electrolyte. The carbon suspension preferably consists of a colloidal suspension in which surfaces of carbon colloidal particles are chemically modified with a hydraulic group such as a carbonyl group, a carboxyl group and a hydroxyl group.

In a washing step 42, the positive and negative electrodes 18, 20 and the outer surface of the case 12 of the used lead-acid storage battery, which has been subjected to the sulfation removing step 34 and the electrode activating step 40, are washed. The washing step 42 is followed by an inspecting/delivering step 44 in which the used lead-acid storage battery is inspected for determining if the battery has a voltage and a specific gravity which conform to a standard satisfying a predetermined acceptance criterion. The specific gravity conforming to the standard is about 1.26. The voltage conforming to the standard is about 12.8 V, where the battery has a nominal voltage of 12 V.

As described above, in the present embodiment, the lead sulfate deposited on the surface of the positive electrode 18 or negative electrode 20 is reduced owing to the flow of the pulsating direct current from the positive electrode 18 toward the negative electrode 20 in the sulfation removing step 34, while at the same time the positive electrode 18 of the lead-acid storage battery 10 is activated through the electrochemical doping in which the carbon suspension obtained by the electrolytic oxidation of the carbon positive electrode is used as at least a part of the battery electrolyte of the lead-acid storage battery 10 in the electrode activating step 40. Therefore, the invention makes it possible to select, as recyclable batteries, a wider range of used lead-acid storage batteries, so that even an used lead-acid storage battery which has a battery electrolyte whose specific gravity is considerably lowered and which accordingly appears to suffer from the sulfation can be recovered to have substantially the same capacity as that of a new lead-acid storage battery. For example, since the lead sulfate is not removed in the technique as disclosed in above-described publication of Japanese Patent No. 2736243, it has been possible-to restore only used lead-acid storage batteries each having a specific gravity of at least 1.24, to a level which permits the batteries to be used as recycled storage batteries. However, the method of the present embodiment makes it possible to restore even batteries each having a specific gravity of about 1.21 or even 12V-batteries each having a voltage of about 4V, to a level which permits the batteries to be used as recycled storage batteries.

Further, according to the present embodiment, the adding of the carbon suspension into the battery electrolyte 22 in the electrode activating step 40 makes it possible to prevent the lead sulfate adhering to the electrode of the lead-acid storage battery 10, thereby providing an advantage that it is not necessary to cause periodic or continuous flow of the pulsating direct current.

FIGS. 5(a), (b), (c), (d), (e) show, by way of examples, voltages of five lead-acid storage batteries of nominal voltage of 12V in each step, for indicating changes of the voltages of the five batteries. Each of FIGS. 5(a), (b) is of a lead-acid storage battery (4A0 915 105B/12V 300 A 563 18/CCA(SAE) 500 AMPS) produced by HOPPECKE company. FIG. 5 (c) is of a lead-acid storage battery (8D0 916 105 B/12V 340 A 60 AH 56093/CCA(SAE) 480 AMPS) produced by MOLL DE KAMINA MIA company. Each of FIGS. 5(d), (e) is of a lead-acid storage battery (4D0 915 105/12V 340 A 70 AH 56069/CCA(SAE) 570 AMPS) produced by MOLL DE KAMINA MLA company. In FIG. 5, the voltage values are given in the unit of volt (V), while the sign "*" indicates that it was impossible to measure the voltage. The voltage values indicated in "AFTER SULFATION REMOVING STEP" and "AFTER ELECTRODE REMOVING STEP" are values measured when one hour passed since the completion of the corresponding step.

While the one embodiment of the present invention has been explained in detail with reference to the drawings, the present invention may be carried out in other modes.

For example, after the selecting step 32 of FIG. 3, the sulfation removing step 34 may be implemented after the electrode activating step 40 has been implemented. Also in this case, even an used lead-acid storage battery which has a battery electrolyte whose specific gravity is considerably lowered and which accordingly appears to suffer from the sulfation can be recovered to have substantially the same capacity as that of a new lead-acid storage battery.

Further, after the selecting step 32 of FIG. 3, a predetermined amount of the above-described carbon suspension is added into the battery electrolyte 22 in the cells 14 of the used lead-acid storage battery 10, and the pulsating direct current outputted from the DC pulse generating device 38 is caused to flow from the positive electrode 18 toward the negative electrode 20, simultaneously with the charge by the charging device 36, whereby the sulfation removing step 34 and the electrode activating step 40 are implemented simultaneously with each other. This arrangement provides an advantage which makes is remarkably reduce a time required for the operation.

It is to be understood that the present invention may be given various modification as far as such modifications do not deviate from the spirit of the invention, although such possible modifications are not illustrated in the present specification.

What is claimed is:

1. A method of recycling a lead-acid storage battery, to recover a capacity of said battery which has been reduced due to deposition of a lead sulfate on a surface of an electrode of said battery, said method comprising:

a first step of causing a pulsating direct current to flow from a positive electrode toward a negative electrode of said battery, for thereby reducing the lead sulfate deposited on the surface of said electrode; and a second step of activating said positive electrode through an electrochemical doping in which a direct current voltage is applied to said battery with a carbon suspension being used as a battery electrolyte of said battery, said carbon suspension being obtained by electrolytic oxidation of a carbon positive electrode in a water system.

2. A method according to claim 1, wherein said pulsating direct current is caused to flow in said first step, by applying, to said battery, a pulsating direct current voltage which is sufficiently higher than a terminal voltage of said battery.

3. A method according to claim 2, wherein said pulsating direct current has a rectangular waveform.

4. A method according to claim 2, wherein said pulsating direct current has a sinusoidal waveform.

5. A method according to claim 2, wherein said pulsating direct current has a partially arcuate waveform.

6. A method according to claim 1, wherein said pulsating direct current is caused to flow from said positive electrode toward said negative electrode in said first step, for a time ranging from 12 to 24 hours.

7. A method according to claim 1, wherein said pulsating direct current used in said first step has a frequency ranging from 2 to 12 kHz.

8. A method according to claim 1, wherein said water system used in said second step consists of one of a pure water system and an aqueous solution of a dilute sulfuric acid.

9. A method according to claim 1, wherein said carbon suspension used in said second step consists of a colloidal suspension in which surfaces of carbon colloidal particles are chemically modified with a hydraulic group selected from a group consisting of a carbonyl group, a carboxyl group and a hydroxyl group.

10. A method according to claim 1, wherein said direct current voltage is applied to said battery in said second step such that an electric current flows from said positive electrode toward said negative electrode of said battery, by using a constant current.

11. A method according to claim 1, wherein said second saw in which said carbon suspension obtained by said electrolytic oxidation of said carbon positive electrode in said water system is added to said battery electrolyte of said battery is implemented before implementation of said first step in which said pulsating direct current is caused to flow from said positive electrode toward said negative electrode of said battery.

12. A method according to claim 1, wherein said water system used in said second step consists of an aqueous solution including a small amount of additive electrolyte which does not deteriorate performance of said lead-acid storage battery when said additive electrolyte is added to a battery electrolyte.

13. A method according to claim 1, wherein said direct current voltage is applied to said battery in said second step such that an electric current flows from said positive electrode toward said negative electrode of said battery, by using a pulsating current which changes in magnitude in a predetermined cycle.

14. A method according to claim 1, wherein said second step in which said carbon suspension obtained by said electrolytic oxidation of said carbon positive electrode in said water system is added to said battery electrolyte of said battery is implemented during implementation of said first step in which said pulsating direct current is caused to flow from said positive electrode toward said negative electrode of said battery.

15. A method according to claim 1, wherein said second step in which said carbon suspension obtained by said electrolytic oxidation of said carbon positive electrode in said water system is added to said battery electrolyte of said battery is implemented after implementation of said first step in which said pulsating direct current is caused to flow from said positive electrode toward said negative electrode of said battery.

* * * * *